United States Patent
Miura et al.

[11] Patent Number: 5,903,814
[45] Date of Patent: May 11, 1999

[54] FLUX CORED WIRES FOR GAS SHIELDED ARC WELDING

[75] Inventors: Toshihiro Miura, Ichihara; Kazutoshi Suda, Tokyo; Masao Kamada, Kazo; Hirotoshi Ishide, Kisarazu, all of Japan

[73] Assignee: Nippon Steel Welding Products & Engineering Co., Ltd., Tokyo, Japan

[21] Appl. No.: 08/903,096

[22] Filed: Jul. 30, 1997

[30] Foreign Application Priority Data

May 3, 1997 [JP] Japan .................................. 9-050691

[51] Int. Cl.⁶ .................................................. B23K 35/362
[52] U.S. Cl. .......................... 428/552; 428/558; 148/24; 148/26; 219/145.22
[58] Field of Search .................. 148/24, 26; 219/145.22, 219/146.3; 428/552, 558

[56] References Cited

U.S. PATENT DOCUMENTS

| | | | |
|---|---|---|---|
| 4,072,845 | 2/1978 | Buckingham et al. | 219/146.3 |
| 4,366,364 | 12/1982 | Arai et al. | 219/145.22 |
| 5,192,016 | 3/1993 | Araki et al. | 219/61 |

FOREIGN PATENT DOCUMENTS 3-193293  8/1991  Japan .
7-80683   3/1995  Japan .
7-116890  5/1995  Japan .

*Primary Examiner*—George Wyszomierski
*Attorney, Agent, or Firm*—Wenderoth, Lind & Ponack, L.L.P.

[57] ABSTRACT

A flux cored wire for gas shielded arc welding with a mixed gas comprising argon and carbon dioxide which comprises:

a seam-welded steel sheath; and a core filled in the steel sheath and comprising, all in weight percent:

a slag and arc stabilizer comprising 4.0 to 6.0% $TiO_2$, 0.2 to 0.8% $SiO_2$, 0.4 to 0.8% $ZrO_2$, 0.2 to 0.8% $Al_2O_3$, 0.06 to 0.25% $Na_2O+K_2O$, and 0.1 to 0.4% metal fluoride;

an alloying agent and metal deoxidizer comprising 0.03 to 0.06% C, 0.20 to 0.80% Si, 1.50 to 2.20% Mn, and 0.30 to 0.60% Mg; and not less than 2% Fe;

in which the difference between the percentages of iron or a combination of Na and K segregated in any two quartered cross section of the wire that are defined by equations (1) and (2) in the specification are not more than 10% and not more than 0.15%, respectively.

7 Claims, 7 Drawing Sheets

FLUX CORED WIRES FOR GAS SHIELDED ARC WELDING

FIELD OF THE INVENTION

This invention relates to flux cored wires that form excellently shaped beads by increasing arc stability and enhancing welding performance in gas shielded arc welding with mixed gases of argon and carbon dioxide, particularly in semiautomatic welding in vertical and overhead positions.

BACKGROUND OF THE INVENTION

Gas shielded arc welding using mixed gases of argon and carbon dioxide provides weld metal containing less oxygen and, therefore, having higher toughness at low temperatures than that obtained from gas shielded arc welding using only carbon dioxide. Furthermore, it reduces spatter, offers high efficiency as it can be used with high currents, and provides excellently shaped beads and good weld appearance. Recently shielding gases containing approximately 20 percent carbon dioxide and a few percent of oxygen in addition to argon have been in wide use.

Flux cored wires comprising steel electrode having a flux core of slag consisting mainly of $TiO_2$ have been finding increasing use in welding steel structures of complicated shapes, such as offshore structures and ships, as flux cored wires of this type permit welding in vertical and overhead positions. They also form weld metals of good quality and provide high welding performance when used with mixed gases comprising argon and carbon dioxide.

The composition and cross-sectional shape of flux cored wires have great influence on arc stability and welding performance. Because flux consisting mainly of slag is at the core of flux cored wires, arcs produced by them tend to spread more than those produced by solid wires. Widespread arcs have an advantage that convex beads are less likely to be formed by downhand and horizontal fillet welding. On the other hand, they tend to form disfigured weld beads in vertical and overhead welding as they are less focused.

Particularly when vertical position welding is done using wires having flux cores of nonuniform segregated compositions with high welding currents of over 250 A, arcs and beads become unstable and the incidence of slag inclusions and other weld defects increases. Therefore, people doing semiautomatic welding have been required to have great skills in the manipulation of electrode wires and the maintenance of uniform arc length.

As the use of automatic welding increases, automatically and semiautomatically welded parts have come to be mixed in more welded structures than before. When automatically welded beads formed by using solid wires and semiautomatically welded beads formed by using conventional flux cored wires are compared, the latter are less properly shaped and more likely to form uneven toes. Therefore, flux cored wires for semiautomatic welding have been required to be improved to produce beads and toes more analogous to those formed by automatic welding.

Japanese Provisional Patent Publication No. 193293 of 1991 proposes flux cored wires with improved arc stability in which the ratio of metal powder to flux in their cross-sectional area is 10 to 90%. Japanese Provisional Patent Publication No. 80683 of 1995 proposes wires in which iron powder is placed at the center of the their cross section. Both wires prevent spatter of weld metal and stabilize the arc by reducing the protrusion of unmolten flux. Still higher arc stability is required for the attainment of better bead shapes.

DESCRIPTION OF THE INVENTION

An object of this invention is to provide flux cored wires for gas shielded arc welding insuring high arc stability that permit satisfactory semiautomatic welding with mixed gases comprising argon and carbon dioxide and provide stable bead shapes.

Another object of this invention is to provide flux cored wires for gas shielded arc welding that stabilize the arc and form uneven bead toes and tough weld metals.

The inventors found that the arc stability of flux cored wires has a relation to the segregation of Fe as a conductor, and Na and K for arc stabilizing, in their cross section. The inventors also found that flux cored wires insuring good arc stability can be obtained by properly adjusting their composition and minimizing the segregation of the substances mentioned above.

The following are the flux cored wires according to this invention that are based on the findings described above.

(1) A flux cored wire for gas shielded arc welding with a mixed gas comprising argon and carbon dioxide which comprises:

a seam-welded steel sheath; and a core filled in the steel sheath and comprising, all in weight percent:

a slag and arc stabilizer comprising 4.0 to 6.0% $TiO_2$, 0.2 to 0.8% $SiO_2$, 0.4 to 0.8% $ZrO_2$, 0.2 to 0.8% $Al_2O_3$, 0.06 to 0.25% $Na_2O+K_2O$, and 0.1 to 0.4% metal fluoride;

an alloying agent and metal deoxidizer comprising 0.03 to 0.06% C, 0.20 to 0.80% Si, 1.50 to 2.20% Mn, and 0.30 to 0.60% Mg; and not less than 2% Fe;

in which the percentage of Fe segregated in the quartered cross section of the wire that is defined by the following equation (1) is not more than 10%:

$$P_{Fe}(\%) = \text{Max.}\ A_{Fe} - \text{Min.}\ A_{Fe} \quad (1)$$

wherein

Max. $A_{Fe}$=maximum area ratio of Fe segregated in the quartered cross section of the wire.

Min. $A_{Fe}$=minimum area ratio of Fe segregated in the quartered cross section of the wire.

(2) A flux cored wire for gas shielded arc welding described in (1) above, in which the percentage of a combination of Na and K segregated in the quartered cross section of the wire that is defined by the following equation (2) is not more than 0.15%:

$$P_{(Na+K)}(\%) = \text{Max.}\ A_{(Na+K)} - \text{Min.}\ A_{(Na+K)} \quad (2)$$

wherein

Max. $A_{(Na+K)}$=maximum area ratio of a combination of Na and K segregated in the quartered cross section of the wire.

Min. $A_{(Na+K)}$=minimum area ratio of a combination of Na and K segregated in the quartered cross section of the wire.

(3) A flux cored wire for gas shielded arc welding described in (1) and (2) above, in which 0.20 to 1.50 wt % Ni is added as an alloying element.

(4) A flux cored wire for gas shielded arc welding described in (1), (2) and (3) above, in which the surface of the wire is coated with Cu.

The cross section of the wires described above is quartered into four equal areas (a, b, c and d) by two straight lines A—A' and B—B' that pass through the center thereof as shown in FIG. 1. The area ratio of Fe ($A_{Fe}$) in each of the quartered sector of the sheath 1 and the flux 2 is determined by electron probe microanalysis. The difference between the maximum and minimum values (Max. $A_{Fe}$ and Min. $A_{Fe}$) is the ratio of Fe segregated ($P_{Fe}$).

Five specimens were cut from a length of 1 m arbitrarily chosen from the wire. By using an x-ray microanalyzer, the cross section of the specimens was analyzed for the presence of Fe using an electron beam of 4×4 µm. The ratio of Fe segregated was determined for each cross section using equation (1) and the values obtained for the five specimens were averaged. The ratio of a combination of Na and K segregated ($P_{(Na+K)}$) was derived in the same manner using equation (2), and the values obtained for the five specimens were averaged.

BRIEF DESCRIPTION OF THE DRAWINGS

In FIG. 1, reference numerals 1 and 2 respectively designate the sheath of a flux cored wire and the flux filled therein.

DETAILED DESCRIPTION

Figure 1:
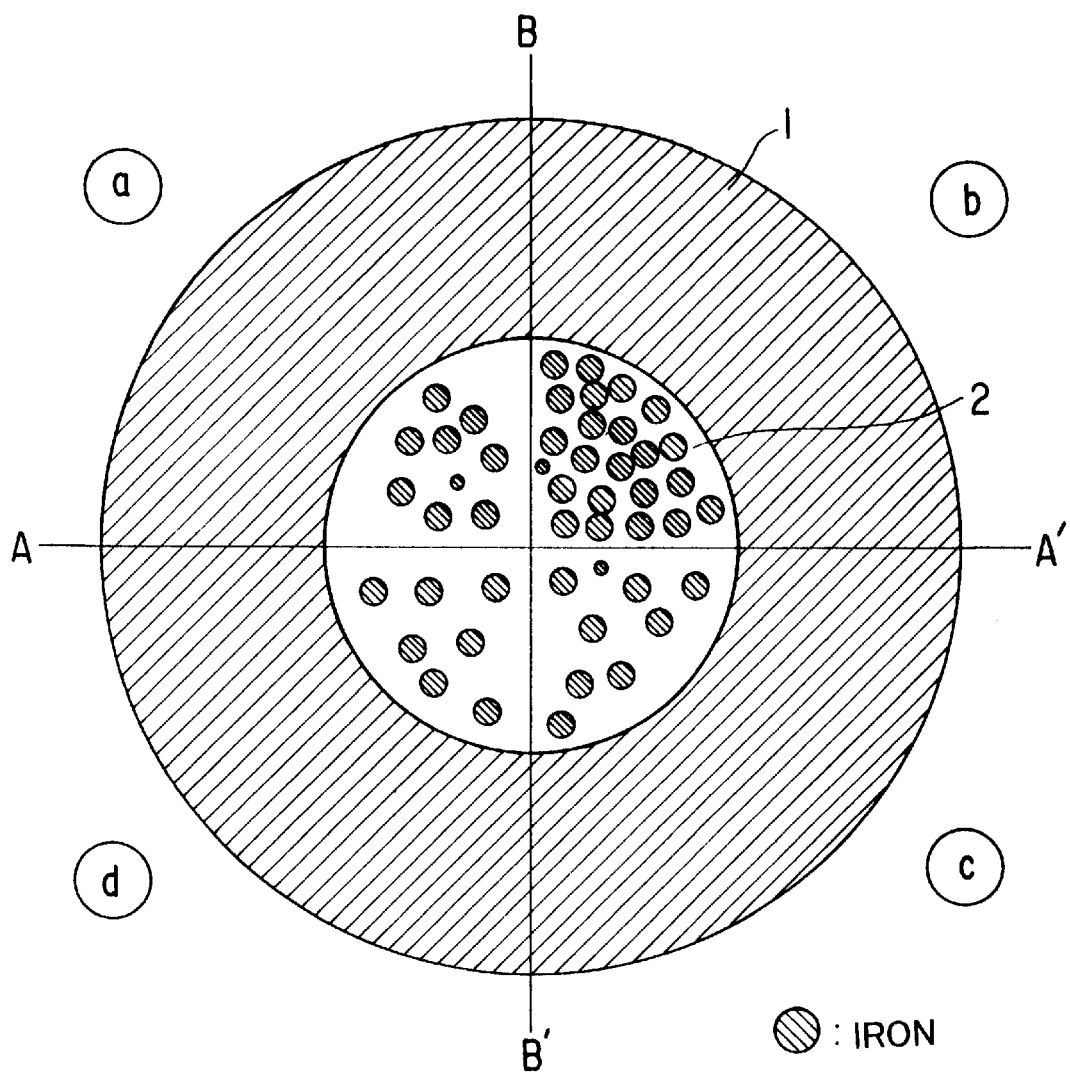
FIG. 1 schematically shows the cross section of a wire in which the ratio of segregation is determined.

Now embodiments of this invention will be described in detail.

The most outstanding feature of the flux cored wires according to this invention is that they provide much higher arc stability than the conventional ones by achieving circumferentially uniform distribution of Fe and a combination of Na and K in the cross section of the wires by controlling their segregation.

Segregation control can be accomplished by, for example, granulating flux powder of proper and uniform grain size, mixing flux power properly for a proper length of time, filling the flux uniformly in the outer sheath of steel strip, and performing the drawing without applying excessive force by using cassette-type roller dies.

A flux cored wire according to this invention is manufactured by forming a sheath of circular shape by bending the width of a steel strip. The circularly bent strip is then formed into a hollow tube by welding the longitudinal seam. Flux is uniformly filled into the hollow tube while the tube is being formed or after the tube has been formed. For example, uniform filing can be efficiently accomplished by using an ultrasonic motor that provides uniform feed of flux.

There wire sheaths according to this invention are limited to those obtained by welding the seam of steel strip. The wire sheaths without seam welding have several disadvantages. They are difficult to coat with Cu and likely to admit moisture through the unwelded joint. The unwelded seam is also likely to cause the wire to snake, thereby making it difficult to adjust the wire leaving the welding torch to the target welding point. Furthermore, the transfer of metal droplets along the seam becomes nonuniform when high welding current is applied because electrical conductivity is low. This is also detrimental to the attainment of arc stability.

The wires according to this invention are suited for use in gas shielded arc welding. However, they do not achieve the desired effect when the shielding gas contains a high percentage of carbon dioxide that distabilizes the transfer of metal droplets. Also, shielding gases containing more than 95% argon do not provide good shielding and impairs the arc concentration. Accordingly, the shielding gases used with the wires according to this invention should preferably be mixed gases of argon and 5 to 30% carbon dioxide. The presence of up to 5% oxygen does not impair the effect of the wires, as well.

The reason why the composition of the wires according to this invention is limited is described below.

To insure high stability of welding arcs and formation of good welds, the elements and their contents in the wires of this invention must be limited as described below.

First, the slag forming and arc stabilizing agents contained in the flux that is filled in the steel sheath of the wires will be described.

$TiO_2$ is not only an arc stabilizer but also a main constituent of the slag forming agent. $TiO_2$ covers and shields the weld metal from the atmosphere and it has a suitable viscosity to affect the form of the weld metal. Particularly in the position welding (i.e., vertical and overhead position welding), the balance of $TiO_2$ and other elements has a great influence on the fluidity of the weld pool. $TiO_2$ also causes the formation of fusible or unfusible nonmetallic inclusions and affects the strength, low-temperature toughness and other properties of the weld metal.

When the content of $TiO_2$ is under 4.0%, the arc stabilizing effect of this invention is unobtainable because the slag does not provide a thick enough covering over the weld metal to effect position welding and arc stability is low. When the $TiO_2$ content exceeds 6.0%, the slag volume becomes so excessive that it becomes difficult to maintain the weld metal in position welding. Unfusible nonmetallic inclusions are formed and the toughness of the weld metal decreases, too.

Constituting the slag forming agent together with $TiO_2$, $SiO_2$ controls the properties of slag, such as the viscosity and the ability to form a coating over the weld metal. When the content of $SiO_2$ is under 0.2%, slag viscosity becomes too low to produce a sufficient quantity of slag in position welding. The falling slag destabilizes the arc and bead shape. When the $SiO_2$ content exceeds 0.8%, slag becomes so viscous that the bead shape becomes convex and bead toes become uneven.

$ZrO_2$ controls the slag viscosity like $SiO_2$ and increases the ease of slag removability. When the content of $ZrO_2$ is under 0.4%, the slag viscosity becomes too low to maintain slag in position welding. The slag becomes less likely to peel and remains in the weld bead, thereby increasing the incidence of slag inclusion in subsequent passes. When the $ZrO_2$ content exceeds 0.8%, the slag viscosity becomes too high and uneven bead toes tend to form.

$Al_2O_3$ serves not only as a slag forming agent that controls the viscosity and covering property but also as an arc stabilizer. When the content of $Al_2O_3$ is under 0.2%, the arc stabilizing effect is unobtainable. The insufficient slag viscosity causes the weld pool to become more likely to fall and destabilizes the shape of the bead. When $Al_2O_3$ content exceeds 0.8%, slag viscosity becomes too high and uneven bead toes are formed.

$Na_2O$ and $K_2O$ respectively dissociate into Na and K when exposed to the heat of the arc. Dissociated Na and K have a great influence on arc stability. When the content of $Na_2O$ and $K_2O$ is under 0.06%, arc stability is too low and the effect to assure a uniform distribution of Na and K is unobtainable. When their content exceeds 0.25%, the arc length increases to such an extent that the shielding gas does not provide sufficient shielding and the deterioration of the weld metal occurs.

One or more of metal fluorides, such as $CaF_2$, $NaF_2$, $MgF_2$ and $BaF_2$ and $K_2ZrF_6$, are used. Metal fluorides generate fluorine gas when decomposed by the welding arc. While the fluorine gas deoxidizes the weld metal, metal fluorides themselves constitute the slag and affects the slag viscosity. When the content of metal fluorides is under 0.1%, the weld metal is not fully deoxidized and fails to acquire adequate toughness. When their content exceeds 0.4%, slag viscosity becomes insufficient, the arc becomes unstable, and ease of position welding decreases.

The reason why the kinds of alloying elements and deoxidizers to be contained in the wires of this invention and their contents is described below.

C strengthens the weld metal by solid-solution strengthening and affects the arc stability and the toughness of the weld metal when added in appropriate quantities. When the content of carbon in the wire is not more than 0.03%, the weld metal does not have adequate strength. When carbon content exceeds 0.06%, low-temperature toughness drops and the desired arc stability of this invention cannot be achieved with high accuracy.

Si deoxidizes and strengthens the weld metal by solid-solution strengthening. When the content of Si is under 0.20%, the weld metal does not have an adequate strength. Besides, arc stability decreases as a result of insufficient deoxidation. The deficiency of $SiO_2$, which is formed as a product of deoxidation, causes an imbalance of slag viscosity and impairs welding performance. When Si content exceeds 0.80%, arc stability decreases.

Mn, like Si, deoxidizes and strengthens the weld metal by solid-solution strengthening. When the content of Mn is under 1.50%, insufficient deoxidation destabilizes the arc. When manganese content exceeds 2.20%, the weld metal becomes excessively strong, with a resulting decrease in low-temperature toughness.

While exhibiting a strong deoxidizing effect in small quantities, Mg does not strengthen the weld metal by solid-solution strengthening like Si and Mn. Thus, Mg provides low-temperature toughness to the weld metal formed by the flux cored wires containing $TiO_2$ based fluxes of low basicity by decreasing the oxygen content therein. While some addition must be made to the wires of this invention, magnesium under 0.30% produces no such effect. When magnesium content exceeds 0.60%, deoxidation becomes too vigorous and the arc becomes unstable.

Ni strengthens the weld metal by solid-solution strengthening and significantly increases the corrosion resistance and low-temperature toughness. So Ni is added to the wires of this invention as required. To obtain the weld metal with adequate toughness, Ni addition of 0.20% minimum should preferably be made. When nickel content exceeds 1.50%, the weld metal becomes too strong and arc stability decreases.

The flux filled in the core of the wires according to this invention must contain some Fe, in addition to the Fe contained in the steel sheath encasing the core. The quantity of Fe added to the flux must be at least 2 wt % of the total weight of the wire. When Fe content in the flux is under 2%, the protrusion of unmolten flux destabilizes the arc.

Limiting the segregation in the cross section of the wire is the most outstanding feature of this invention. The reason why this limitation is imposed is described below.

Figure 8:
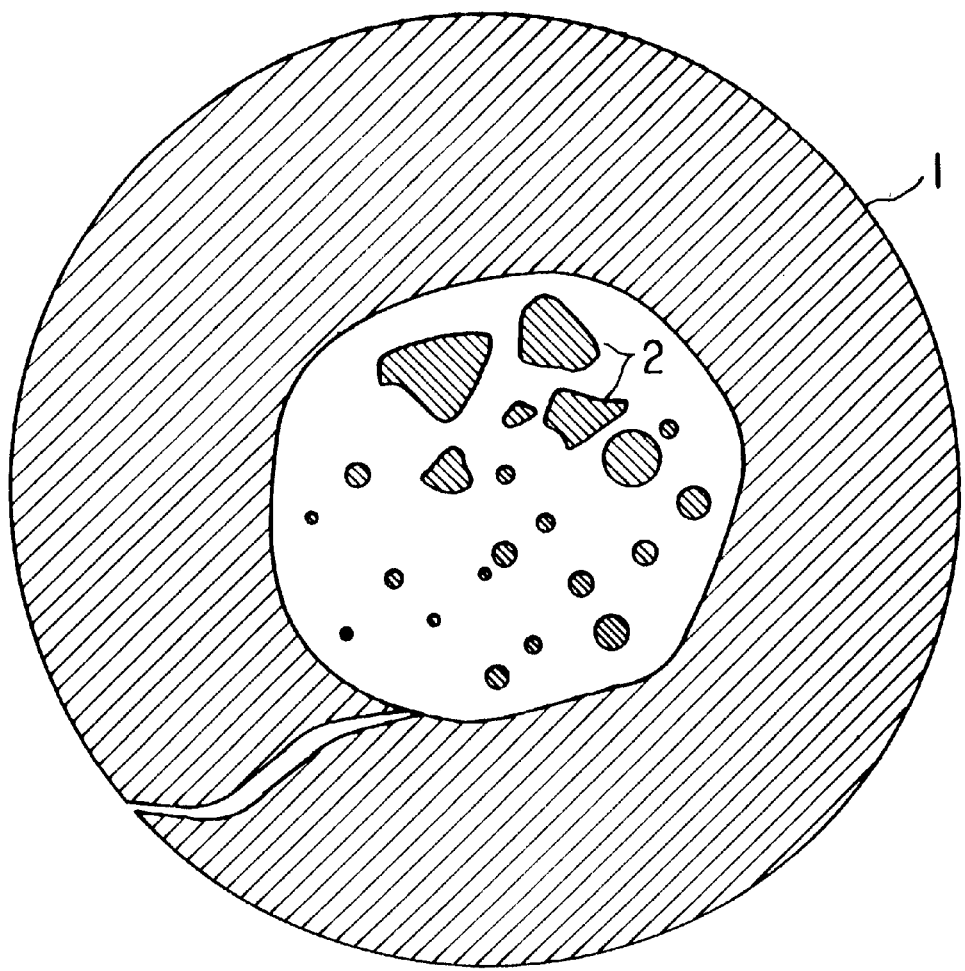
FIG. 8 schematically shows the state of Fe segregated in the cross section of a conventional flux cored wire.

The inventors closely examined the cross section of conventional flux cored wires using an electron microscope. Radial distribution of the main constituents of the flux 2 in the cross section of the conventional wires as show in FIG. 8 examined proved to be uneven because of the insufficient preparation of the flux and the disfiguring of the outer sheath 1 in the drawing operation. By assuming that the presence of uneven bead toes results from the uneven distribution of the core flux constituents, studies were made to find a method to obtain their even distribution in the cross section of the wire.

The inventors found that the segregation ratio of the flux can be controlled by choosing flux materials of proper grain size and proper mixing, filling and drawing methods. Further studies to investigate the relationship between segregation and arc conditions were made using trial wires prepared by varying the degree of segregation.

The studies led to the discovery of a relationship between the uniformity of the radial distribution of the main constituents of the flux in the cross section of the wire, particularly the uniformity of the segregation of Fe and that of Na and K, and the arc stability. It was also found that the use of flux cored wires in which the segregation of Fe and a combination of Na and K is properly controlled assures the provision of high arc stability and the formation of satisfactory weld beads with even bead toes.

When the segregation ratio of Fe in the cross section of the wire defined by equation (1) given earlier is kept at 10% or below, the size of metal droplets becomes homogenized, metal droplets fall from more evenly distributed points of the wire, and the transfer of metal droplets becomes stabilized.

Here, the Fe in the cross section of the wire consists of the iron contained in the steel sheath and the iron powder and ferroalloys contained in the flux.

Because Na and K serve as a powerful arc stabilizer as mentioned earlier, the degree of their distribution in the cross section of the flux has a great influence on the stability of the arc. Keeping the segregation ratio of a combination of Na and K defined by equation (2) given earlier at 3% or below is conducive to the improvement of the arc stability.

Application of electrolytic or chemical Cu coating on the surface of the wire is preferable as it permits uniform conducting of electric current from the tip to the wire and thus insures a further improvement in the arc stability.

EXAMPLE 1

The inventors first investigated the relationship between segregation and arc conditions using trial wires prepared by varying the degree of the segregation of their main constituents.

The ratios by weight of the constituents to the total weight of the trial wire were as follows: $TiO_2$: 5.5%, $SiO_2$: 0.5%, $ZrO_2$: 0.5%, $Al_2O_3$: 0.5%, $Na_2O+K_2O$: 0.24%, NaF as metal fluoride: 0.15%, C: 0.05%, Si: 0.60%, Mn: 1.80%, Ni: 0.40%, and Mg: 0.40%. The flux filling ratio was 15% and the wire diameter was 1.2 mm. The surface of the wires was coated with Cu.

The relationship with arc stability was studied by using the trial wires with a mixed gas consisting of 77% argon, 20% carbon dioxide and 3% oxygen.

Five specimens were cut from a length of 1 m arbitrarily chosen from the wire. By using an x-ray microanalyzer, the cross section of the specimens was analyzed for the presence of Fe and a combination of Na and K using an electron beam of 4×4 μm. The ratios of Fe and a combination of Na and K segregated were determined for each cross section using equation (1) for Fe and (2) for Na and K. Then, the values obtained for the five each specimens were averaged.

FIG. 1 schematically shows the first cross section of Example No. 1. The area ratios of Fe in quartered sectors a, b, c and d were 82.0, 86.7, 80.4 and 83.3%, respectively. The segregation ratio was 6.3%.

Welding was done by using an automatic welder that fixes the distance between the base metal and the tip at 20 mm. The base metal was a 25 mm thick plate of JIS G 3106 SM 490 steel. Joints with a 60-degree vee groove were welded by vertical upward welding. With DCEP polarity, the welding current, arc voltage and welding speed were 260 amperes, 26 volts and 30 cm per minute.

Changes in the arc voltage during welding were determined by a high-speed digital measuring system. Changes in the voltage waveform during a period of 30 seconds were statistically processed as voltage distribution, and their standard deviation was used as an index of arc stability.

Figure 2:
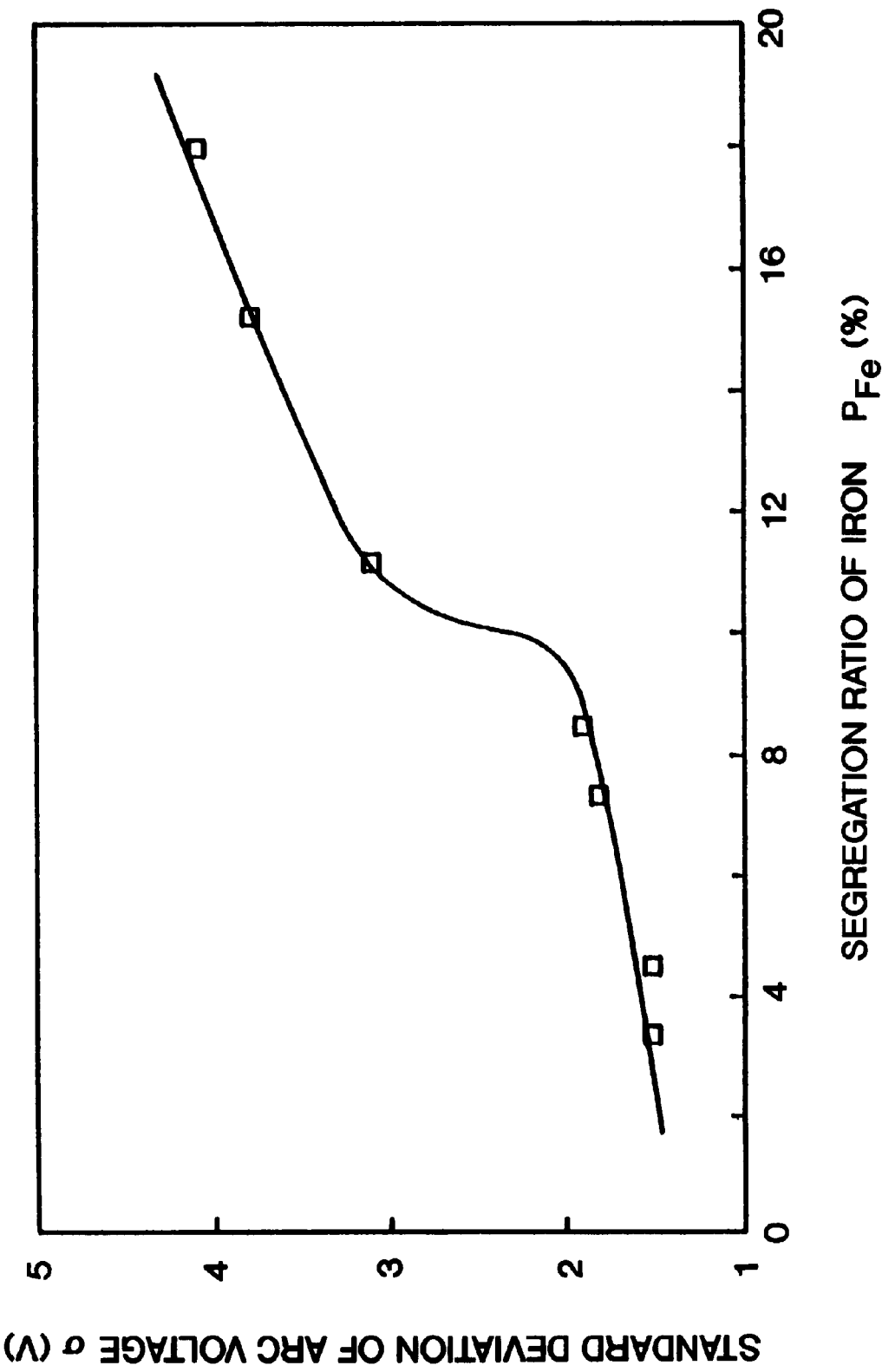
FIG. 2 graphically shows the relationship between the ratio of Fe segregated in the cross section of the wire and the standard deviation of arc voltage.

FIG. 2 shows the relationship between the segregation ratio of Fe $P_{Fe}$ and the standard deviation of arc voltage σ. As can be seen in FIG. 2, the standard deviation of arc voltage increased with an increase in the segregation ratio of Fe. The value of the standard deviation became very large when the segregation ratio exceeded 10%.

Figure 3:
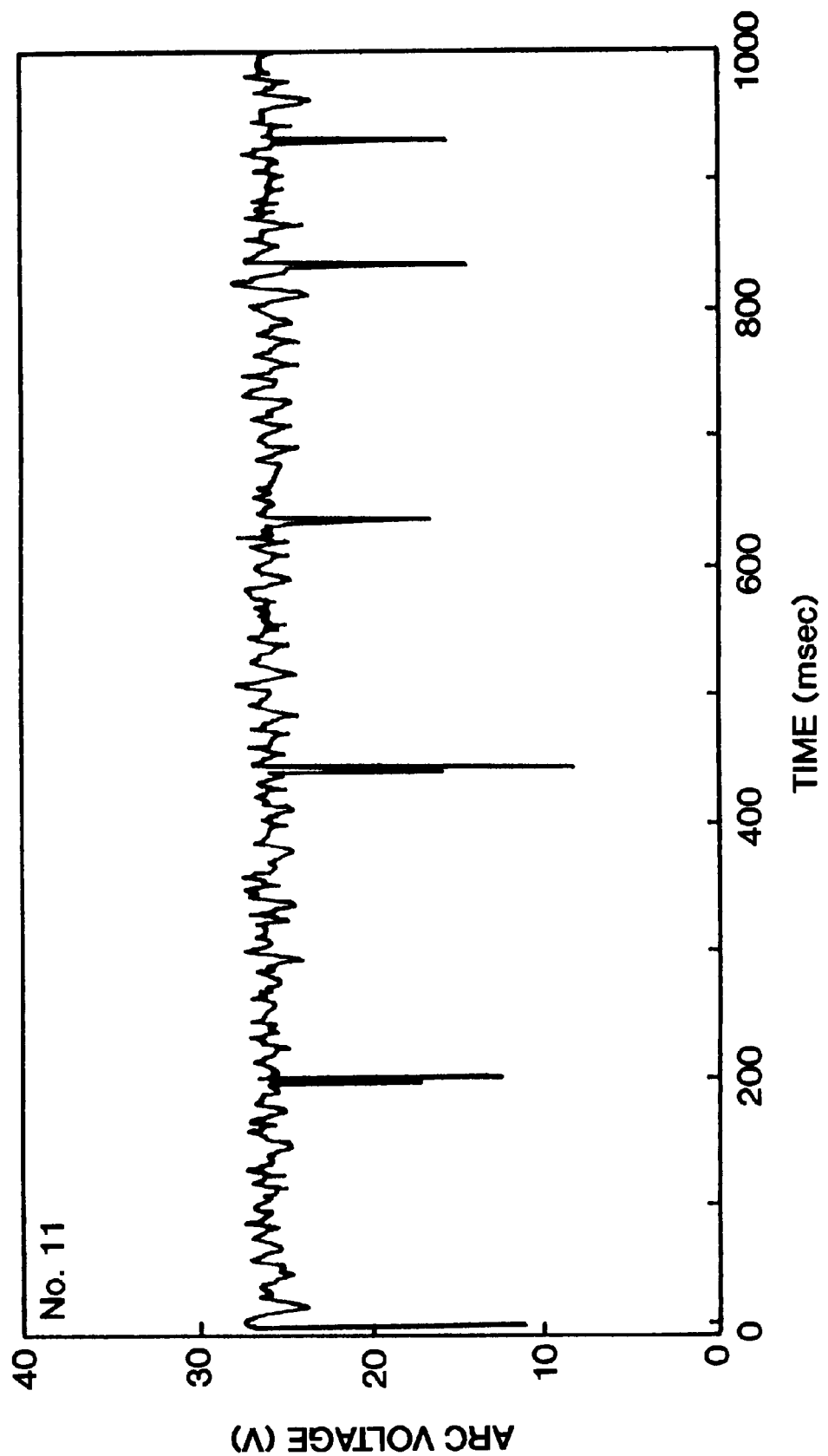
FIG. 3 shows how the arc voltage changed in a weldability test on a wire whose $P_{Fe}$ is 6.3% (Specimen 11 in Table 1).
Figure 4:
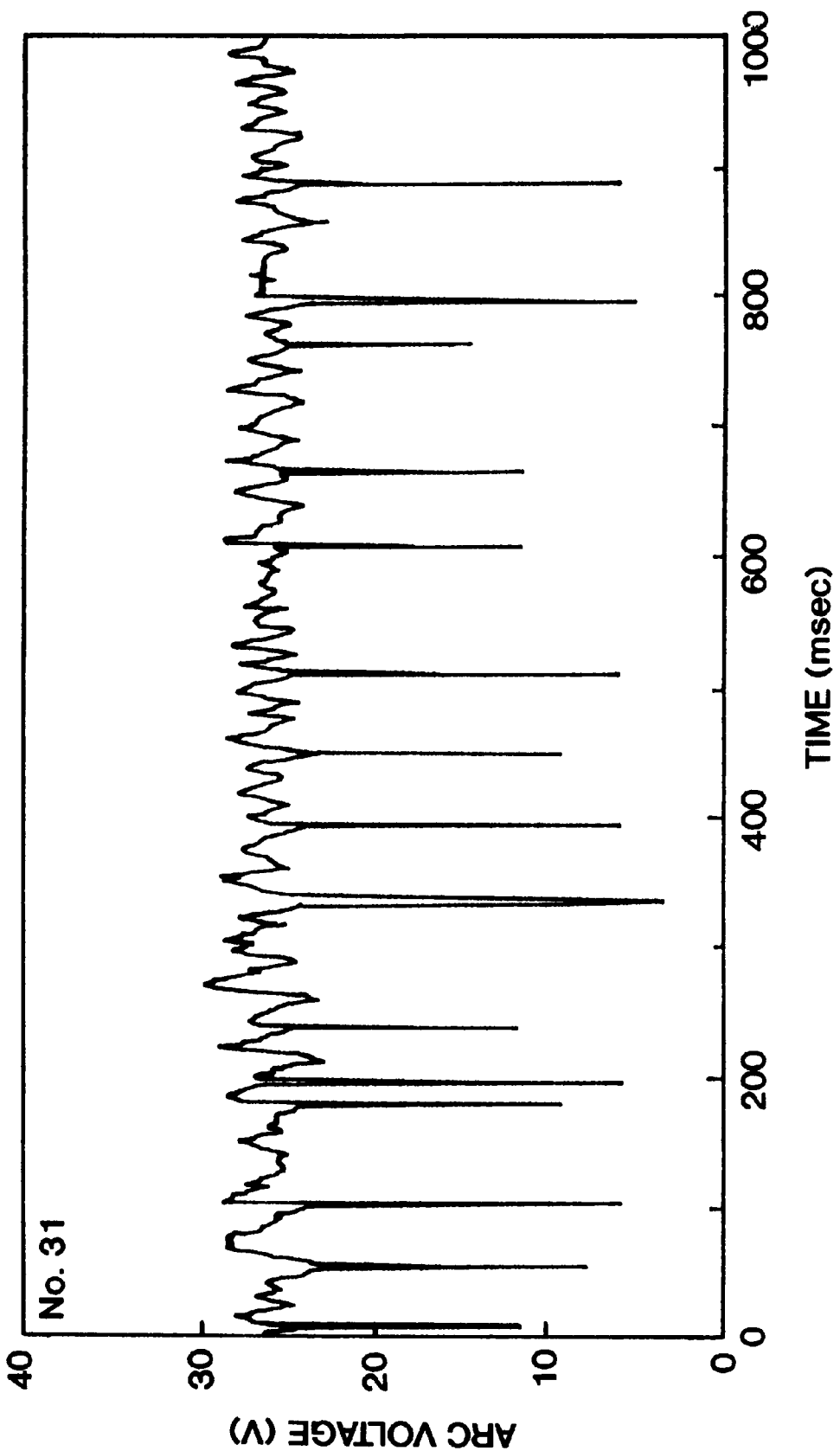
FIG. 4 shows how the voltage waveform changed in a weldability test on a wire whose $P_{Fe}$ is 11.2% (Specimen 31 in Table 1).

FIGS. 3 and 4 show a portion of the arc voltage of wires whose $P_{Fe}$'s are 6.3 and 11.2 (specimens Nos. 11 and 31 in Table 1). The changes in arc voltage were related to arc stability and the transfer of metal droplets. Voltage varied more widely in the wire with a segregation ratio of over 10% (FIG. 4) than in the wire with a lower segregation ratio (FIG. 3). Also, it was found that unstable voltage changes presumably due to momentary short circuit occur at frequent but irregular intervals.

From the observation of bead appearance, it was found that bead toes became uneven when the segregation ratio of iron exceeded 10%.

Figure 5:
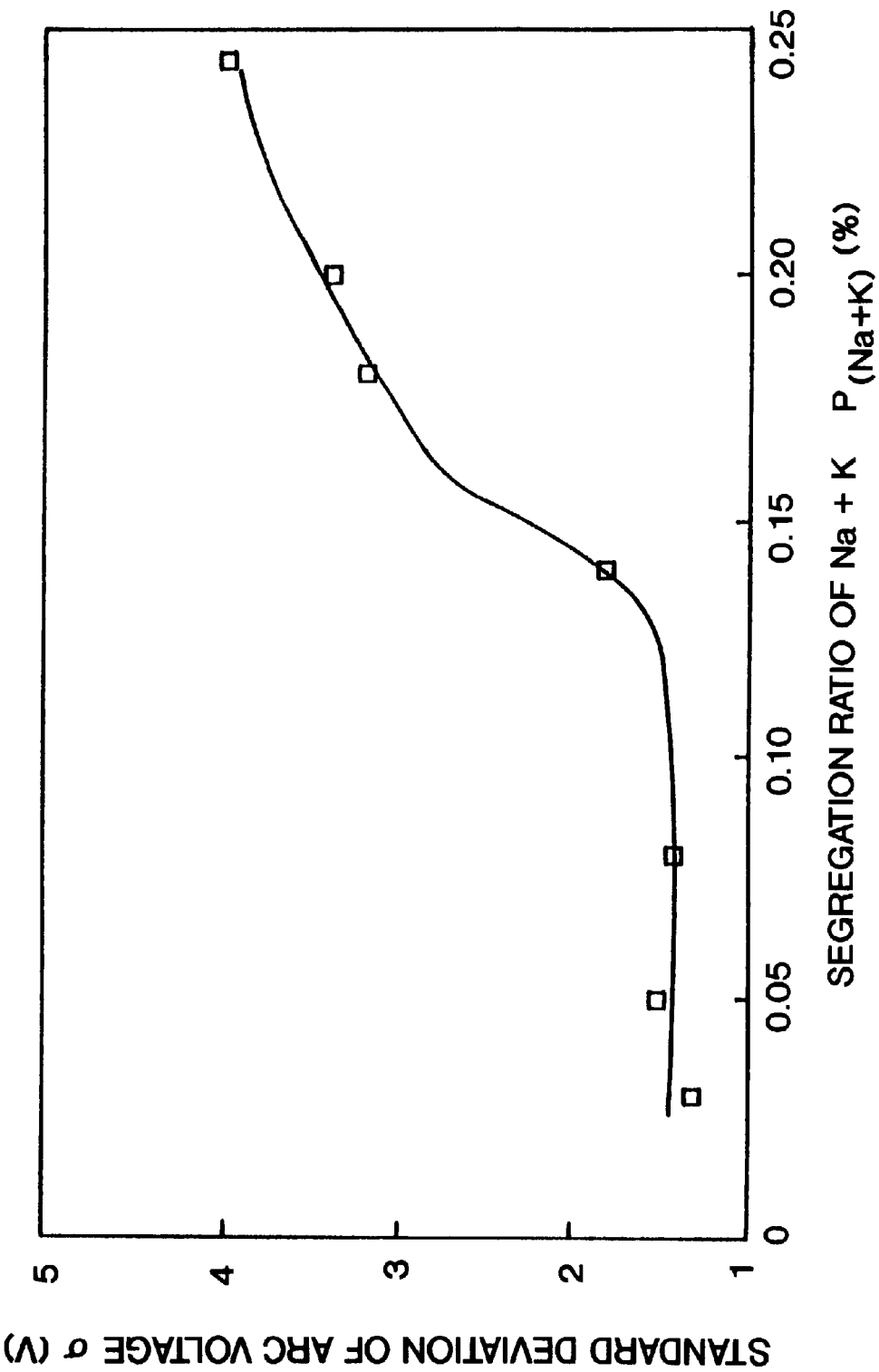
FIG. 5 graphically shows the relationship between the ratio of a combination of Na and K segregated in the cross section of the wire and the standard deviation of arc voltage.

To investigate the influence of the segregation ratio of a combination of Na and K, trial wires were prepared by varying their segregation using combinations of liquid materials, such as sodium silicate or potassium silicate, and powder materials, such as NaF and $K_2SiF_2$. FIG. 5 shows the relationship of the segregation ratio of a combination of Na and K with the standard deviation of arc voltage. As can be seen in FIG. 5, good arc stability was obtained by keeping the segregation ratio of a combination of Na and K at 0.15% or below.

EXAMPLE 2

The relationship between arc stability and the properties of the weld metal was investigated by preparing trial wires of varying compositions. Table 1 shows the compositions and segregation ratios of the trial wires prepared. All wires had an outer sheath of mild steel, a flux core filled with a filling ratio of 15%, and a diameter of 1.2 mm. All wires were coated with Cu.

Vertical automatic welding was applied to the wires listed in Table 1 under the conditions described in Table 2. Arc stability was evaluated by calculating the standard deviation of arc voltages, whereas welding performance was evaluated by visual observation of the conditions of arc, including the state of spattering, and evenness of bead toes.

Furthermore, the JIS Z 3111 Class A1 tensile specimens and JIS Z 3111 Class 4 specimens taken from the center of the thickness of the steel welded under the conditions described in Table 3 were subjected to a tensile test at room temperature and a Charpy impact test with a 2 mm deep V notch at −20° C. Table 4 shows the results of the tests. The results of the impact test are shown by the values averaged from three pieces of specimens.

In Tables 1 and 4, specimens 1 to 11 represent the wires according to this invention, whereas specimens 12 to 32 represent the conventional wires tested for comparison.

As evident from Table 4, specimens Nos. 12, containing under 4.0% $TiO_2$, and 17, containing over 6.0% $TiO_2$, made inappropriate volumes of slag. Both produced unstable arcs, caused much spattering, produced wide variations in arc voltage that led to great standard deviations, and failed to provide satisfactorily even bead toes.

Containing less than 0.2% $SiO_2$, less than 0.4% $ZrO_2$ and less than 0.2% $Al_2O_3$, specimens Nos. 18, 19 and 20 failed to permit stable welding in a vertical position due to insufficient slag viscosity. Containing, conversely, more than 0.8% each of $SiO_2$, $ZrO_2$ and $Al_2O_3$, specimens Nos. 13, 14 and 15 caused wide variations in arc voltage and produced uneven bead toes because of excessively high slag viscosity.

Specimen No. 21 that contained less than 0.06% of $Na_2O$ and $K_2O$ failed to produce stable arcs and caused frequent spattering as a result of short circuits. Specimen No. 22 containing over 0.25% of $Na_2O$ and $K_2O$ produced too long arcs and failed to achieve the convergence of the arc. Also, the absorbed energy in the impact test of the weld metal at −20° C. was poor.

The weld metal produced by specimen No. 16 containing less than 0.1% metal fluoride had a high oxygen content and a low low-temperature toughness. Specimen No. 22 containing an excessive quantity of metal fluoride caused wide variations in arc voltage and produced uneven bead toes.

Influences of metallic constituents were as described below. The weld metal formed by specimen No. 23 containing less than 0.03% C produced had low strength. By contrast, specimen No. 26 containing more than 0.06% C produced the weld metal with excessive strength, caused frequent spattering, and developed wide variations in arc voltage.

Specimen No. 28 containing less than 0.20% Si and specimen No. 24 containing less than 1.50% Mn failed to produce uniform arcs and provide adequate low-temperature toughness because of arc destabilization due to insufficient deoxidation. Specimen No. 25 containing more than 0.80% Si caused frequent spattering and produced uneven arcs. Specimen No. 25 also failed to provide adequate low-temperature toughness as the Mg content therein was lower than 0.30%. Specimen No. 27 containing over 2.20% Mn produced the weld metal of excessive strength but inadequate low-temperature toughness. Specimen No. 26 containing less than 0.20% Ni failed to produce stable arcs and provide adequate low-temperature toughness.

Specimen No. 29 containing more than 1.50% Ni and more than 0.60% Mg failed to produce uniform arcs.

Specimen No. 30 containing less than 2% Fe in the flux produced unstable arcs because of the excessive protrusion of unmolten flux.

Specimen No. 31 in which the segregation ratio of Fe exceeded 10% and specimen No. 32 in which the segregation ratio of a combination of Na and K exceeded 0.15% caused wide variations in arc voltage.

As compared with the above-described specimens taken from the conventional wires for comparative test, specimens Nos. 1 to 11 taken from the wires according to this invention all had properly controlled compositions and low segregation ratios of Fe and a combination of Na and K, produced stable arcs with high accuracy, and formed weld metals of satisfactory properties.

TABLE 1

| Classification | Specimen No. | Wire Composition (by Weight Percent) Slag forming Agent | | | | | | | |
|---|---|---|---|---|---|---|---|---|---|
| | | $TiO_2$ | $SiO_2$ | $ZrO_2$ | $Al_2O_3$ | $Na_2O$ | $K_2O$ | $Na_2O + K_2O$ | Metal Fluoride |
| Wires of This Invention | 1 | 5.51 | 0.49 | 0.45 | 0.45 | 0.11 | 0.04 | 0.15 | 0.15 |
| | 2 | 4.22 | 0.71 | 0.77 | 0.72 | 0.11 | 0.04 | 0.15 | 0.11 |
| | 3 | 4.35 | 0.50 | 0.45 | 0.72 | 0.11 | 0.04 | 0.15 | 0.30 |
| | 4 | 5.82 | 0.21 | 0.43 | 0.25 | 0.04 | 0.02 | 0.06 | 0.39 |
| | 5 | 5.51 | 0.49 | 0.45 | 0.45 | 0.11 | 0.13 | 0.24 | 0.39 |
| | 6 | 5.51 | 0.49 | 0.45 | 0.45 | 0.11 | 0.04 | 0.15 | 0.15 |
| | 7 | 5.51 | 0.49 | 0.45 | 0.45 | 0.11 | 0.04 | 0.15 | 0.15 |
| | 8 | 5.51 | 0.49 | 0.45 | 0.45 | 0.11 | 0.04 | 0.15 | 0.15 |
| | 9 | 5.51 | 0.49 | 0.45 | 0.45 | 0.11 | 0.04 | 0.15 | 0.15 |
| | 10 | 5.51 | 0.50 | 0.49 | 0.50 | 0.11 | 0.13 | 0.24 | 0.15 |
| | 11 | 5.50 | 0.50 | 0.50 | 0.50 | 0.11 | 0.13 | 0.24 | 0.15 |
| Conventional Wires Tested for Comparison | 12 | 3.83 | 0.68 | 0.77 | 0.72 | 0.11 | 0.04 | 0.15 | 0.11 |
| | 13 | 4.22 | 0.95 | 0.77 | 0.72 | 0.11 | 0.04 | 0.15 | 0.11 |
| | 14 | 4.22 | 0.70 | 0.92 | 0.72 | 0.11 | 0.04 | 0.15 | 0.11 |
| | 15 | 4.22 | 0.70 | 0.77 | 0.92 | 0.11 | 0.04 | 0.15 | 0.11 |
| | 16 | 4.22 | 0.70 | 0.77 | 0.72 | 0.11 | 0.04 | 0.15 | 0.03 |
| | 17 | 6.22 | 0.25 | 0.45 | 0.26 | 0.04 | 0.02 | 0.06 | 0.39 |
| | 18 | 5.82 | 0.13 | 0.45 | 0.26 | 0.04 | 0.02 | 0.06 | 0.39 |
| | 19 | 5.82 | 0.24 | 0.35 | 0.26 | 0.04 | 0.02 | 0.06 | 0.39 |
| | 20 | 5.82 | 0.24 | 0.45 | 0.15 | 0.04 | 0.02 | 0.60 | 0.39 |
| | 21 | 5.82 | 0.24 | 0.45 | 0.26 | 0.02 | 0.02 | 0.04 | 0.39 |
| | 22 | 5.82 | 0.24 | 0.45 | 0.26 | 0.18 | 0.10 | 0.28 | 0.43 |
| | 23 | 5.51 | 0.49 | 0.45 | 0.45 | 0.11 | 0.04 | 0.15 | 0.15 |
| | 24 | 5.51 | 0.49 | 0.45 | 0.45 | 0.11 | 0.04 | 0.15 | 0.15 |
| | 25 | 5.51 | 0.49 | 0.45 | 0.45 | 0.11 | 0.04 | 0.15 | 0.15 |
| | 26 | 5.51 | 0.49 | 0.45 | 0.45 | 0.11 | 0.04 | 0.15 | 0.15 |
| | 27 | 5.51 | 0.49 | 0.45 | 0.45 | 0.11 | 0.04 | 0.15 | 0.15 |
| | 28 | 5.51 | 0.49 | 0.45 | 0.45 | 0.11 | 0.04 | 0.15 | 0.15 |
| | 29 | 5.51 | 0.49 | 0.45 | 0.45 | 0.11 | 0.04 | 0.15 | 0.15 |
| | 30 | 4.35 | 0.50 | 0.45 | 0.72 | 0.11 | 0.04 | 0.15 | 0.30 |
| | 31 | 5.51 | 0.50 | 0.49 | 0.50 | 0.11 | 0.13 | 0.24 | 0.15 |
| | 32 | 5.50 | 0.50 | 0.50 | 0.50 | 0.11 | 0.13 | 0.24 | 0.15 |

| Classification | Specimen No. | Wire Composition (by Weight Percent) | | | | | | | | Segregation of Iron (%) | Segregation of Na + K (%) |
|---|---|---|---|---|---|---|---|---|---|---|---|
| | | Deoxidizer/Alloying Element | | | | | Fe | | | | |
| | | C | Si | Mn | Ni | Mg | Flux | Sheath | Others | | |
| Wires of This Invention | 1 | 0.05 | 0.60 | 1.80 | 0.40 | 0.40 | 3.9 | 84.5 | Remainder | 6.3 | 0.05 |
| | 2 | 0.05 | 0.60 | 1.80 | 0.40 | 0.40 | 3.2 | 84.1 | Remainder | 8.1 | 0.08 |
| | 3 | 0.05 | 0.60 | 2.00 | 0.01 | 0.40 | 3.6 | 84.6 | Remainder | 6.1 | 0.05 |
| | 4 | 0.05 | 0.60 | 1.80 | 0.40 | 0.30 | 4.0 | 84.5 | Remainder | 3.5 | 0.03 |
| | 5 | 0.05 | 0.60 | 1.80 | 0.40 | 0.30 | 2.4 | 84.8 | Remainder | 7.4 | 0.14 |
| | 6 | 0.03 | 0.78 | 1.51 | 0.40 | 0.30 | 3.1 | 84.3 | Remainder | 5.6 | 0.06 |
| | 7 | 0.06 | 0.60 | 2.15 | 0.20 | 0.40 | 3.6 | 84.2 | Remainder | 8.4 | 0.07 |
| | 8 | 0.05 | 0.20 | 1.51 | 1.50 | 0.57 | 2.9 | 84.5 | Remainder | 2.3 | 0.02 |
| | 9 | 0.05 | 0.60 | 1.80 | 0.40 | 0.40 | 3.3 | 84.5 | Remainder | 6.5 | 0.05 |
| | 10 | 0.05 | 0.60 | 1.80 | 0.40 | 0.40 | 3.5 | 84.5 | Remainder | 8.5 | 0.05 |
| | 11 | 0.15 | 0.60 | 1.80 | 0.40 | 0.40 | 3.5 | 84.5 | Remainder | 6.3 | 0.08 |
| Conventional Wires Tested for Comparison | 12 | 0.05 | 0.60 | 1.80 | 0.40 | 0.40 | 4.4 | 84.6 | Remainder | 3.5 | 0.04 |
| | 13 | 0.05 | 0.60 | 1.80 | 0.40 | 0.40 | 3.5 | 84.2 | Remainder | 5.5 | 0.04 |
| | 14 | 0.05 | 0.60 | 1.80 | 0.40 | 0.40 | 3.7 | 84.1 | Remainder | 6.5 | 0.05 |
| | 15 | 0.05 | 0.60 | 1.80 | 0.40 | 0.40 | 3.3 | 84.0 | Remainder | 6.8 | 0.06 |
| | 16 | 0.05 | 0.60 | 1.80 | 0.40 | 0.40 | 3.0 | 84.2 | Remainder | 9.2 | 0.07 |
| | 17 | 0.05 | 0.60 | 1.80 | 0.40 | 0.30 | 3.3 | 84.7 | Remainder | 6.5 | 0.04 |
| | 18 | 0.05 | 0.60 | 1.80 | 0.40 | 0.30 | 2.6 | 84.1 | Remainder | 6.5 | 0.04 |
| | 19 | 0.05 | 0.60 | 1.80 | 0.40 | 0.30 | 2.3 | 84.6 | Remainder | 6.3 | 0.05 |
| | 20 | 0.05 | 0.60 | 1.80 | 0.40 | 0.30 | 4.3 | 84.2 | Remainder | 6.1 | 0.04 |
| | 21 | 0.05 | 0.60 | 1.80 | 0.40 | 0.30 | 3.1 | 84.6 | Remainder | 7.0 | 0.02 |
| | 22 | 0.05 | 0.60 | 1.80 | 0.40 | 0.30 | 2.6 | 84.0 | Remainder | 6.8 | 0.16 |
| | 23 | 0.02 | 0.60 | 1.51 | 0.40 | 0.30 | 4.0 | 84.7 | Remainder | 7.3 | 0.05 |

TABLE 1-continued

| | | | | | | | | | | |
|---|---|---|---|---|---|---|---|---|---|---|
| 24 | 0.03 | 0.60 | 1.45 | 0.40 | 0.30 | 2.9 | 84.6 | Remainder | 6.3 | 0.05 |
| 25 | 0.03 | 0.83 | 1.51 | 0.40 | 0.26 | 3.3 | 84.5 | Remainder | 5.9 | 0.06 |
| 26 | 0.07 | 0.60 | 2.15 | 0.20 | 0.40 | 2.8 | 84.3 | Remainder | 6.3 | 0.06 |
| 27 | 0.06 | 0.60 | 2.24 | 0.15 | 0.40 | 3.4 | 84.2 | Remainder | 7.3 | 0.07 |
| 28 | 0.05 | 0.18 | 1.51 | 1.50 | 0.57 | 2.9 | 84.5 | Remainder | 6.8 | 0.08 |
| 29 | 0.05 | 0.20 | 1.51 | 1.63 | 0.65 | 3.6 | 84.5 | Remainder | 6.7 | 0.09 |
| 30 | 0.05 | 0.60 | 2.00 | 0.40 | 0.40 | 1.3 | 84.6 | Remainder | 4.3 | 0.05 |
| 31 | 0.05 | 0.60 | 1.80 | 0.40 | 0.40 | 3.5 | 84.5 | Remainder | 11.2 | 0.05 |
| 32 | 0.05 | 0.60 | 1.80 | 0.40 | 0.40 | 3.5 | 84.5 | Remainder | 6.3 | 0.18 |

TABLE 2

Arc Stability and Welding Performance Testing Conditions

Figure 6:
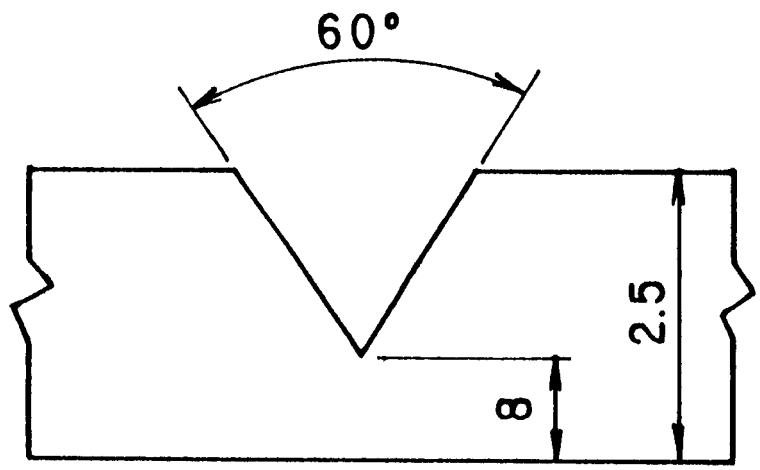
FIG. 6 is a cross-sectional view showing the profile and size of a groove used in a weldability test on embodiments of this invention.

| | |
|---|---|
| Base Metal | JIS SM490B, 25 mm thick |
| Groove Profile | FIG. 6 |
| Welding Position | Vertical Upward (Automatic) |
| Shielding Gas | |
| Kind | 77% Ar - 20% $CO_2$ - 3% $O_2$ |
| Quantity | 25 l/min |
| Polarity | DCEP |
| Distance between Tip and Base Metal | 20 mm |
| Welding Current | 260 A |
| Arc Voltage | 26 V |
| Welding Speed | 30 cm/min |

TABLE 3

Welding Metal Quality Test

Figure 7:
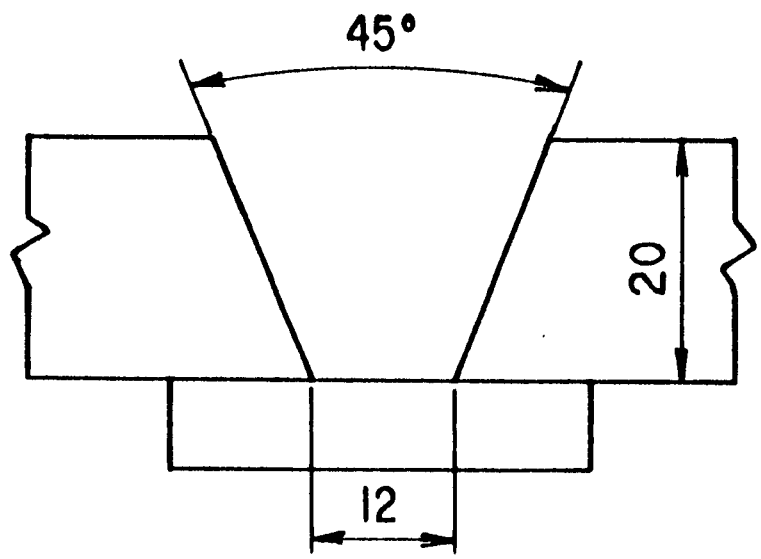
FIG. 7 is a cross-sectional view showing the profile and size of a groove used in a weld metal test on embodiments of this invention.

| | |
|---|---|
| Base Metal | JIS SM490B, 20 mm thick |
| Groove Profile | FIG. 7 |
| Welding Position | Down Hand (Automatic) |
| Shielding Gas | |
| Kind | 77% Ar - 20% 20% $CO_2$ - 3% $O_2$ |
| Quantity | 25 l/min |
| Polarity | DCEP |
| Distance between Tip and Base Metal | 20 mm |
| Welding Current | 270 A |
| Welding Voltage | 27 V |
| Welding Speed | 25 cm/min |
| Preheating Temperature | 100° C. |
| Interpass Temperature | 130–150° C. |

TABLE 4

Performance in Vertical Position Welding Properties of Weld Metal

| Classification | Specimen No. | Arc | Spatter | Bead Toe Evenness | Standard Deviation of Arc Voltage (V) | Tensile Test Strength (N/mm$^2$) | Impact Test $vE_{-20}$ (J) | Other Properties |
|---|---|---|---|---|---|---|---|---|
| Wires of This Invention | 1 | Good | Little | Good | 1.45 | 560 | 103 | Arc stability/mechanical properties of weld metal: Good |
| | 2 | Good | Little | Good | 1.35 | 565 | 96 | Arc stability/mechanical properties of weld metal: Good |
| | 3 | Good | Little | Good | 1.40 | 570 | 61 | Arc stability/mechanical properties of weld metal: Good |
| | 4 | Good | Little | Good | 1.78 | 562 | 85 | Arc stability/mechanical properties of weld metal: Good |
| | 5 | Good | Little | Good | 1.81 | 554 | 82 | Arc stability/mechanical properties of weld metal: Good |
| | 6 | Good | Little | Good | 1.45 | 561 | 78 | Arc stability/mechanical properties of weld metal: Good |
| | 7 | Good | Little | Good | 1.89 | 595 | 102 | Arc stability/mechanical properties of weld metal: Good |
| | 8 | Good | Little | Good | 1.88 | 590 | 123 | Arc stability/mechanical properties of weld metal: Good |
| | 9 | Good | Little | Good | 1.96 | 565 | 96 | Arc stability/mechanical properties of weld metal: Good |
| | 10 | Good | Little | Good | 1.90 | 576 | 83 | Arc stability/mechanical properties of weld metal: Good |
| | 11 | Good | Little | Good | 1.42 | 583 | 91 | Arc stability/mechanical properties of weld metal: Good |
| Conventional Wires Tested For Comparison | 12 | Unstable | Much | Poor | 3.15 | 570 | 85 | Arc stability: Poor |
| | 13 | Unstable | Much | Poor | 2.95 | 581 | 29 | Arc stability/low-temperature toughness: Poor |
| | 14 | Unstable | Much | Poor | 3.35 | 565 | 65 | Arc stability: Poor |

TABLE 4-continued

Performance in Vertical Position Welding Properties of Weld Metal

| Classification | Specimen No. | Arc | Spatter | Bead Toe Evenness | Standard Deviation of Arc Voltage (V) | Tensile Test Strength (N/mm$^2$) | Impact Test vE$_{-20}$ (J) | Other Properties |
|---|---|---|---|---|---|---|---|---|
| | 15 | Unstable | Much | Poor | 3.55 | 590 | 35 | Arc stability/low-temperature toughness: Poor |
| | 16 | Good | Little | Good | 1.96 | 580 | 31 | Low-temperature toughness: Poor |
| | 17 | Unstable | Much | Poor | 4.05 | 582 | 37 | Arc stability/low-temperature toughness: Poor |
| | 18 | Unstable | Much | Poor | 3.11 | 556 | 76 | Arc stability: Poor |
| | 19 | Unstable | Much | Poor | 3.28 | 548 | 80 | Arc stability: Poor |
| | 20 | Unstable | Much | Poor | 3.70 | 551 | 82 | Arc stability: Poor |
| | 21 | Unstable | Much | Poor | 3.33 | 545 | 80 | Arc stability: Poor |
| | 22 | Unstable | Much | Poor | 4.20 | 590 | 33 | Arc stability/low-temperature toughness: Poor |
| | 23 | Good | Little | Good | 1.50 | 482 | 51 | Strength: Insufficient |
| | 24 | Unstable | Much | Poor | 3.42 | 521 | 38 | Arc stability/low-temperature toughness: Poor |
| | 25 | Unstable | Much | Poor | 3.05 | 555 | 34 | Arc stability/low-temperature toughness: Poor |
| | 26 | Unstable | Much | Poor | 3.50 | 635 | 22 | Arc stability/low-temperature toughness: Poor |
| | 27 | Good | Little | Good | 1.98 | 621 | 30 | Low-temperature toughness: Poor |
| | 28 | Unstable | Much | Poor | 3.95 | 510 | 40 | Arc stability/low-temperature toughness: Poor |
| | 29 | Unstable | Much | Poor | 4.01 | 625 | 68 | Arc stability: Poor |
| | 30 | Unstable | Much | Poor | 3.64 | 581 | 98 | Arc stability: Poor |
| | 31 | Unstable | Much | Poor | 3.12 | 510 | 72 | Arc stability: Poor |
| | 32 | Unstable | Much | Poor | 3.25 | 625 | 69 | Arc stability: Poor |

EFFECT OF THE INVENTION

As described earlier, the flux cored wires according to this invention provide high arc stability, even bead toes and high toughness in gas shielded arc welding using mixed gases containing argon and carbon dioxide.

What is claimed is:

1. A flux cored wire for gas shielded arc welding with a mixed gas comprising argon and carbon dioxide, said wire comprising:

a seam-welded steel sheath; and a core filled in the steel sheath and comprising, all in weight percent:

a slag and arc stabilizer comprising 4.0 to 6.0% TiO$_2$, 0.2 to 0.8% SiO$_2$, 0.4 to 0.8% ZrO$_2$, 0.2 to 0.8% Al$_2$O$_3$, 0.06 to 0.25% Na$_2$O+K$_2$O, and 0.1 to 0.4% metal fluoride;

an alloying agent and metal deoxidizer comprising 0.03 to 0.06% C, 0.20 to 0.80% Si, 1.50 to 2.20% Mn, and 0.30 to 0.60% Mg; and not less than 2% Fe;

in which the difference between the percentages of iron segregated in any two quartered cross sections of the wire is defined by the following equation (1) and said difference is not more than 10%:

$$P_{Fe}(\%) = \text{Max. } A_{Fe} - \text{Min. } A_{Fe} \quad (1)$$

wherein

Max. $A_{Fe}$ = maximum area ratio of Fe segregated in any one quartered cross section of the wire, and Min. $A_{Fe}$ = minimum area ratio of Fe segregated in any one quartered cross section of the wire.

2. A flux cored wire for gas shielded arc welding according to claim 1, further comprising 0.20 to 1.50wt % Ni as an alloying element.

3. A flux cored wire for gas shielded arc welding according to claim 2, in which the surface of the wire is coated with Cu.

4. A flux cored wire for gas shielded arc welding according to claim 1, in which the surface of the wire is coated with Cu.

5. A flux cored wire for gas shielded arc welding according to claim 1, in which the difference between the percentages of a combination of Na and K segregated in any two quartered cross sections of the wire is defined by the following equation (2) and said difference is not more than 0.15%:

$$P_{(Na+K)}(\%) = \text{Max. } A_{(Na+K)} - \text{Min. } A_{(Na+K)} \quad (2)$$

wherein

Max. $A_{(Na+K)}$ = maximum area ratio of a combination of Na and K segregated in any one quartered cross section of the wire, and Min. $A_{(Na+K)}$ = minimum area ratio of a combination of Na and K segregated in any one quartered cross section of the wire.

6. A flux cored wire for gas shielded arc welding according to claim 5, further comprising 0.20 to 1.50wt % Ni as an alloying element.

7. A flux cored wire for gas shielded arc welding according to claim 5, in which the surface of the wire is coated with Cu.

* * * * *